United States Patent [19]

Lawler et al.

[11] Patent Number: 5,516,020
[45] Date of Patent: May 14, 1996

[54] TRUCK MOUNT BICYCLE RACK

[76] Inventors: Russ Lawler, 11265 Clemson Dr., Alta Loma, Calif. 91701; John Moffat, 23111 Ventura Blvd., Woodland Hills, Calif. 91364

[21] Appl. No.: 395,568

[22] Filed: Feb. 28, 1995

Related U.S. Application Data

[63] Continuation of Ser. No. 266,518, Jun. 28, 1994, abandoned.

[51] Int. Cl.⁶ ..................................................... B60R 9/10
[52] U.S. Cl. .................... 224/405; 224/402; 224/493; 224/536; 224/321; 224/570; 211/19
[58] Field of Search ................................ 224/492, 405, 224/402, 403, 492, 493, 497, 533, 535, 536, 321, 42.11, 42.12, 42.13, 548, 567, 569, 570, 924; 211/5, 17, 19

[56] References Cited

U.S. PATENT DOCUMENTS

| | | | |
|---|---|---|---|
| 577,663 | 2/1897 | Peace | 211/21 |
| 590,443 | 9/1897 | Temple | 211/21 |
| 639,991 | 12/1899 | Jewell | 211/19 |
| 764,774 | 7/1904 | Sargeant | 211/18 |
| 1,078,559 | 11/1913 | Seabrook | 248/551 |
| 2,283,975 | 5/1942 | Dillou | 24/569 |
| 3,766,759 | 10/1973 | Artner | 248/553 |
| 3,785,500 | 1/1974 | Kennelly | 211/5 |
| 3,921,869 | 11/1975 | Rogers | 224/42.03 B |
| 4,061,257 | 12/1977 | St. Clair | 224/42.08 |
| 4,434,922 | 3/1984 | Brandsen et al. | 224/42.03 B |
| 4,709,840 | 12/1987 | Allen | 224/321 |
| 4,934,572 | 6/1990 | Basman et al. | 224/42.45 R |
| 5,074,012 | 12/1991 | Mitchell | 24/569 |
| 5,092,504 | 3/1992 | Hannes et al. | 224/42.03 B |
| 5,167,395 | 12/1992 | Pearman et al. | 248/551 |
| 5,236,110 | 8/1993 | Schmidt | 224/42.42 |
| 5,303,858 | 4/1994 | Price | 224/42.45 R |

FOREIGN PATENT DOCUMENTS

| 2527149 | 11/1983 | France | 224/42.03 B |

*Primary Examiner*—Henry J. Recla
*Assistant Examiner*—Charles R. Eloshway
*Attorney, Agent, or Firm*—David O'Reilly

[57] ABSTRACT

An elegantly simple bicycle storage rack that can be mounted or demounted quickly and easily from the cargo area of pick-up trucks. The rack is comprised of a lower tubular base and an upper tubular member joined by a plurality of upright posts spaced by slots for bicycle wheels. The lower tubular base fits comfortably in the foremost corner of the cargo area of the pick-up truck. The upper tubular member is secured to the sides of the pick-up truck with straps, cords or wires. A bicycle is held securely in the rack by a c-shaped hook or clamp that fits around the steering neck, frame of bicycle frame mounting and is secured with a specially designed locknut. No additional, straps, nuts, locks or other devices are needed to securely hold the bicycle in the rack. The bicycle storage rack is also constructed to be easily mounted on a surface platform when not in use in the back of a pick-up truck.

17 Claims, 3 Drawing Sheets

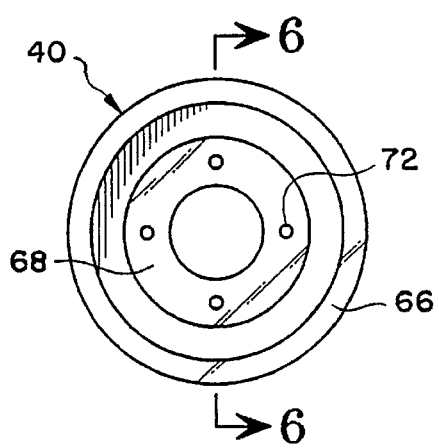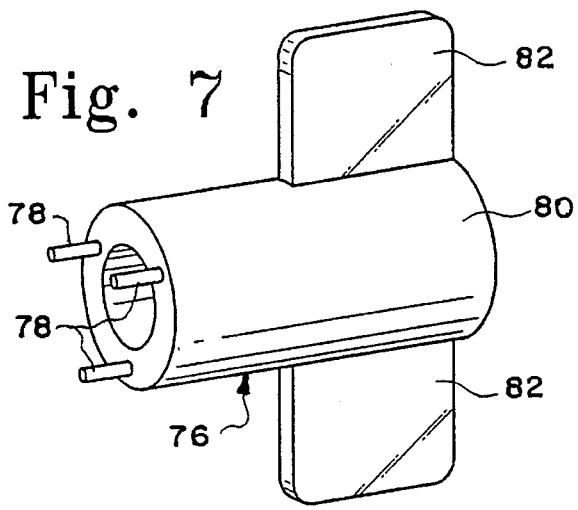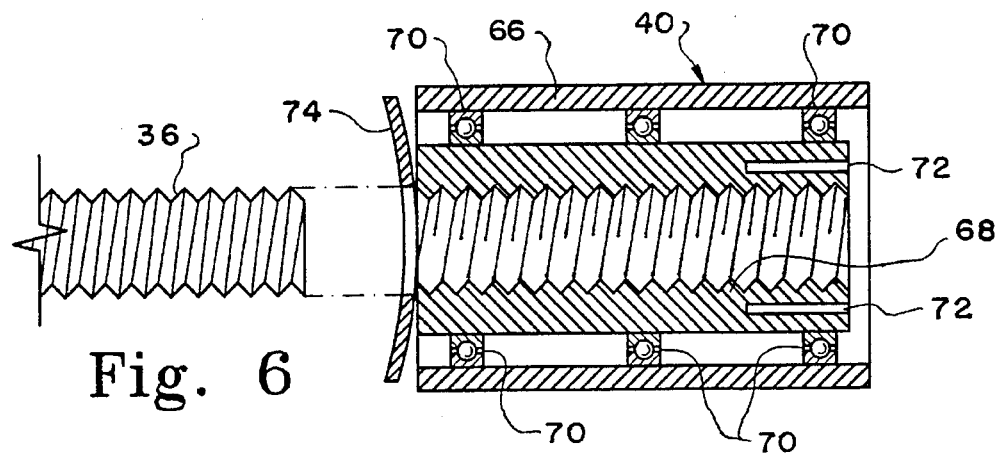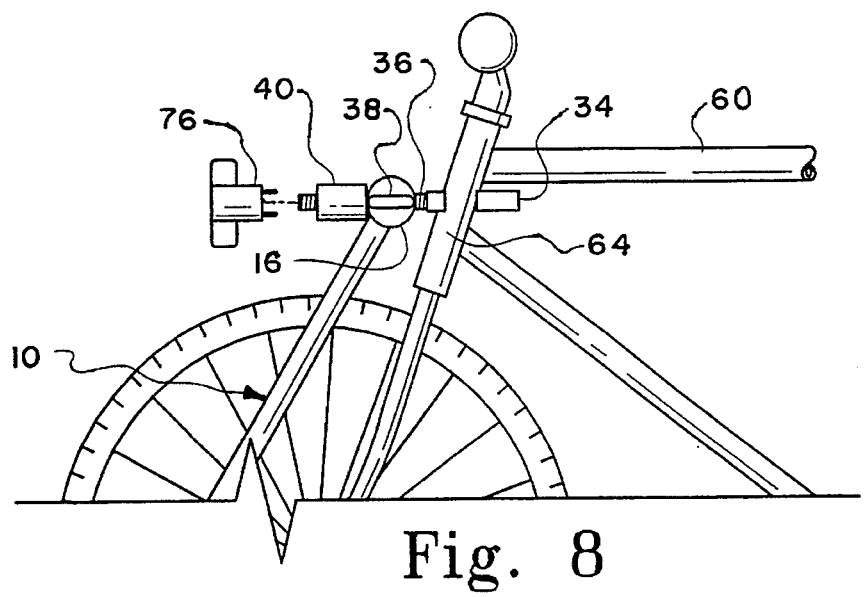

TRUCK MOUNT BICYCLE RACK

This Application is a Continuation of Application Ser. No. 08/266,518 filed Jun. 28, 1994, now abandoned.

FIELD OF THE INVENTION

This invention relates to storage for bicycles and more particularly, relates to a bicycle storage rack that can be quickly and easily mounted in the cargo area of a pick-up truck or similar vehicle, or optionally can be mounted on a fixed base.

BACKGROUND OF THE INVENTION

Bicycle storage devices of prior art come in a wide variety of designs and configurations. Some are simple while others are complex and involve roof mounting bars, and some require partial disassembly of a bicycle. Some are as simple as a horizontal bar having spring loaded clamps such as that shown in the Hurlbut U.S. Pat. No. 512,548 issued Jan. 9, 1894 while others may be complex in constructions having alternating slots formed on a base and a longitudinal bar that passes through the spokes of the wheels such as the bicycle rack of Kennelly U.S. Pat. No. 3,785,500 issued Jan. 15, 1974. The latter is complicated and difficult to use because the rod is inconvenient and time consuming to remove, particularly if only a single bicycle needs to be removed from the rack.

The general configuration of racks shown in prior patents is in the form of a rectangular base having a plurality of upright rods or bars forming slots for receiving bicycle wheels. In some cases these devices fold when not in use. Folding bicycle racks are shown in the U.S. Patents of Peace Pat. No. 577,663 issued Feb. 23, 1987; Frambes U.S. Pat. No. 592,086 issued Oct. 19, 1897; Temple U.S. Pat. No. 590,443 issued Sep. 21, 1897; Wilcox U.S. Pat. No. 620,863 issued Mar. 7, 1899 and Martinell U.S. Pat. No. 5,133,461 issued Jul. 28, 1992. Similar bicycle racks are also shown in the design patents of Martinell U.S. Pat. No. DES. 328,822 issued Aug. 25, 1992; Oliver U.S. Pat. No. 2,768 issued Oct. 18, 1897 and Pine U.S. Pat. No. 27,769 issued Oct. 19, 1897.

Other examples of the variety of bicycle racks available is shown by the Hands U.S. Pat. No. 5,092,504 that requires a front wheel to be removed and separately locked to the rack. An example of a bicycle storage device for buildings and garages or the like is shown in the Ivatt U.S. Pat. No. 621,819 issued Mar. 28, 1899. In the latter device, wheel slots are mounted on a wall with a bar mounted on the ceiling. Of course, none of these devices are convenient or suitable for carrying bicycles on the bed of a pick-up truck.

Vehicle mounted carriers for bicycles and the like are shown in Bert et al U.S. Pat. No. 4,852,779 issued Aug. 1, 1989; Bowman U.S. Pat. No. 3,912,139 issued Oct. 14, 1975 and Richard U.S. Pat. No. 4,171,077. The Bowman Patent describes a cycle carrier for mounting on the flat bed of a pick-up truck. It is held in place by crossbars that clamp against opposite sidewalls of a truck cargo area. It is complicated in construction and has a channel having a hole for receiving the front wheel of a motorcycle. It is not easily removed and installed and is not convenient for carrying bicycles.

The Bert et al Patent discloses a collapsible rack having a base and a rectangular frame forming slots to receive the front wheel of a vehicle. This patent shows a complicated construction in which the rack appears to be heavy and cumbersome and must include additional tie-down devices to hold the cycle in place. Presumably, when not in use, a portion of the rack frame will fold flat against the mounting surface. The construction is complicated and is difficult to use. Further, it is not easily removable when not in use.

The Richard U.S. Pat. No. 4,171,077 shows a bicycle rack for mounting on the rear of a vehicle. In this case, the rack is mounted on a bus and has four channels for receiving up to four bicycles. Channel members are mounted on a frame that is constructed to engage the lower edge of the bumper of a vehicle. Similar devices have been constructed for mounting a bicycle on the rear of automobiles and trucks.

Each of the bicycle storage devices or racks, designed for use on vehicles, suffer from a number of disadvantages. In some cases the front wheel must be removed from the fork on the vehicle mounted on a locking arrangement with the front wheel stored separately or in a separate locking mechanism. The configuration of the racks do not allow them to be used with commonly employed liners for truck beds without substantial alterations to the liner such as cutting hole, etc. An additional disadvantage is that the attachment mechanism for the racks are relatively complex and time consuming to use. They do not permit the racks to be easily installed and removed. In fact, many of these racks are essentially permanently mounted, limiting the use of the truck or reducing cargo carrying usefulness substantially. Some even require drilling holes in the vehicle to permanently alter the cargo area.

It is one object of the present invention to provide an elegantly simple bicycle storage rack for mounting bicycles in the cargo area of a pick-up truck.

Another object of the present invention is to provide a bicycle storage rack which can be mounted or removed from a pick-up truck and secured with only two wires, cords or straps.

Yet another object of the present invention is to provide a bicycle storage mounting rack that can be quickly and easily removed and stored in the cab of a truck, or remounted on a stationary platform.

Yet another object of the present invention is to provide an elegantly simple bicycle storage rack that can be installed and removed without special tools.

Yet another object of the present invention is to provide an elegantly simple bicycle storage rack that utilizes the cargo area of a pick-up truck to provide support, minimizing and simplifying the construction of the rack.

Still another object of the present invention is to provide a bicycle storage rack that can be quickly and easily set-up, and does not require any disassembly of a bicycle for storage.

Yet another object of the present invention is to provide a bicycle storage rack that takes advantage of the existing cargo bed configuration to permit use without modification of cargo bed liners.

Still another object of the present invention is to provide an elegantly simple bicycle storage rack which will permit bicycles to be stored in alternate arrangements to maximize the number of bicycles that can be stored and transported.

Yet another object of the present invention is to provide an elegantly simple bicycle storage rack that when removed, can be used as a free standing rack.

Yet another object of the present invention is to provide a bicycle storage or rack, and a secure simple locking device that deters theft of bicycles mounted in the rack.

BRIEF DESCRIPTION OF THE INVENTION

The purpose of the present invention is to provide an elegantly simple bicycle storage rack that is easily and quickly mounted or demounted from the cargo area of a pick-up truck for storage and transportation of bicycles.

The bicycle storage rack is elegantly simple in construction and is comprised of a tubular base and a plurality of upright tubular rods and shafts joining a horizontal upper tubular member. The plurality of upright tubular rods or shafts provide slots for receiving the front or rear wheel of a bicycle. The upright tubular rods or shafts are formed in pairs spaced to conveniently receive the front or rear wheel of a bicycle. Preferably, the upright rods or bars are spaced to easily receive a bicycle wheel without the necessity of removing any parts.

The base or lower tubular member is constructed to seat in the forward end or corner of the cargo area of a pick-up truck against the rear of the cab. The upper horizontal member is then tilted away from the cab and held in position by cords, straps or wires that are configured to be easily attached or removed without the necessity of special tools. The cords or straps are secured to the sidewall at the forward end of the cargo area of the pick-up truck with the other end being fastened to eyelets or holes in the upper horizontal tubular member of the bicycle storage rack. This is the only structural support needed to provide a strong base for mounting and transporting bicycles in a pick-up truck cargo area.

A unique locking mechanism is provided for locking the bicycle in the bicycle storage rack in the form of a C-shaped hook that fits around the steering neck, frame or the seat support bar. A threaded shaft on the C-shaped hook passes through a hole at the upper horizontal tubular member of the rack and is securely tightened with a specially configured nut that requires a key for removal. The nut is in the form of a threaded cylinder configured for removal only by the special key. An outer concentric smooth cylinder mounted on ball bearings prevents rotation of the threaded cylinder without the special key. The specially designed nut and key eliminates the need for padlocks, cables or other external security devices.

The elegantly simple bicycle storage rack is installed by placing the base at the crevice or foremost carrier between the floor of the cargo area and the rear of the pick-up cab area. The upper end is then secured to the sidewalls of the cargo area by cords, straps or wires extending from the top of the upper tubular member to a fastening device such as eyelets mounted on the upper edge of the cargo area's sidewall. Eyelets or holes in the upper tubular member connect the straps to the hooks or eyelets mounted on the cargo area sidewalls.

The bicycle storage rack may be easily and quickly set up to transport one or more bicycles mounted and secured by the C-shaped hook and specially constructed nut. The bicycle storage rack is easily removed by disconnecting the straps by simply lifting it from the bed of the truck for storage in the cab or mounting on a stationary base. To mount on a stationary base, holes are provided in the tubular base that fit on posts mounted on a rectangular frame.

The above and other novel features of the invention will be more fully understood from the following detailed description and the accompanying drawings, in which:

BRIEF DESCRIPTION OF THE DRAWINGS

FIG. 5 is an end view of a specially constructed nut for locking bicycles in the bicycle storage rack.

FIG. 6 is a sectional view illustrating the key configured locking nut and the method of mounting it on the threaded shaft of the C-shaped hook.

FIG. 7 is a perspective view of a key for use with the keyed locking nut of FIG. 5 and 6.

FIG. 8 is a partial sectional view illustrating the mounting of a bicycle in the cargo area bicycle storage rack with the specially constructed key configured locking nut.

DETAILED DESCRIPTION OF THE INVENTION

Figure 1:
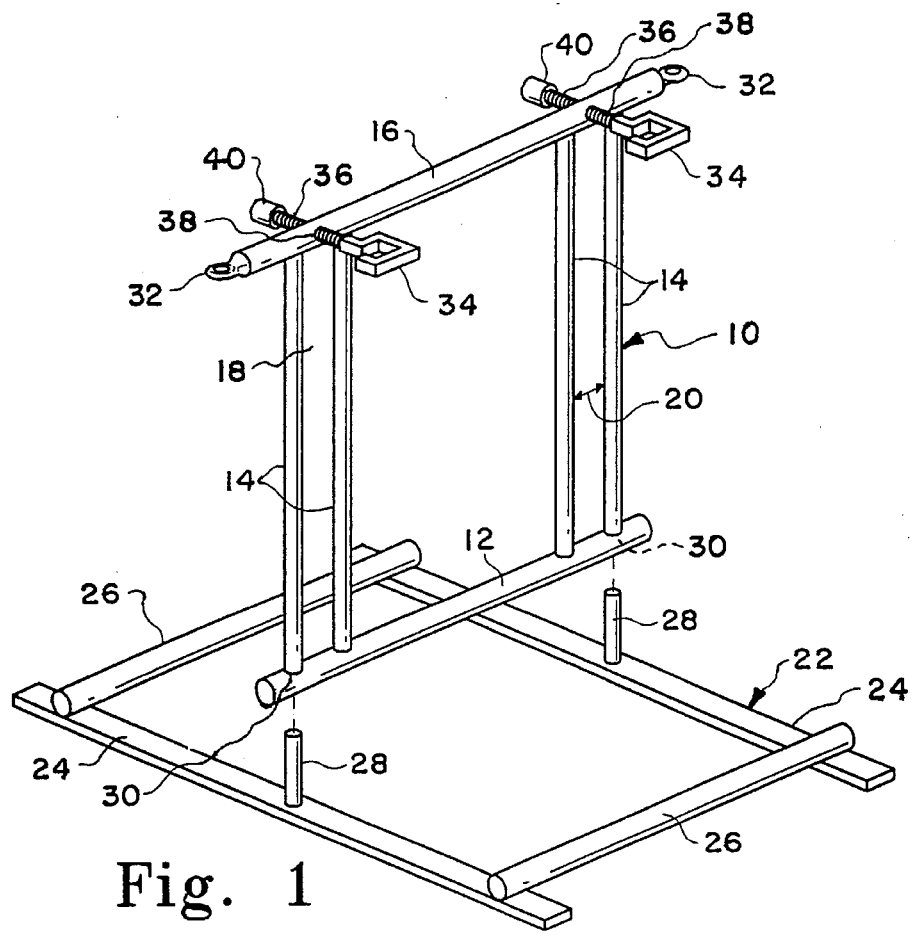
FIG. 1 is a perspective view of an elegantly simple bicycle storage rack constructed according to the invention when mounting on a stationary platform.
Figure 2:
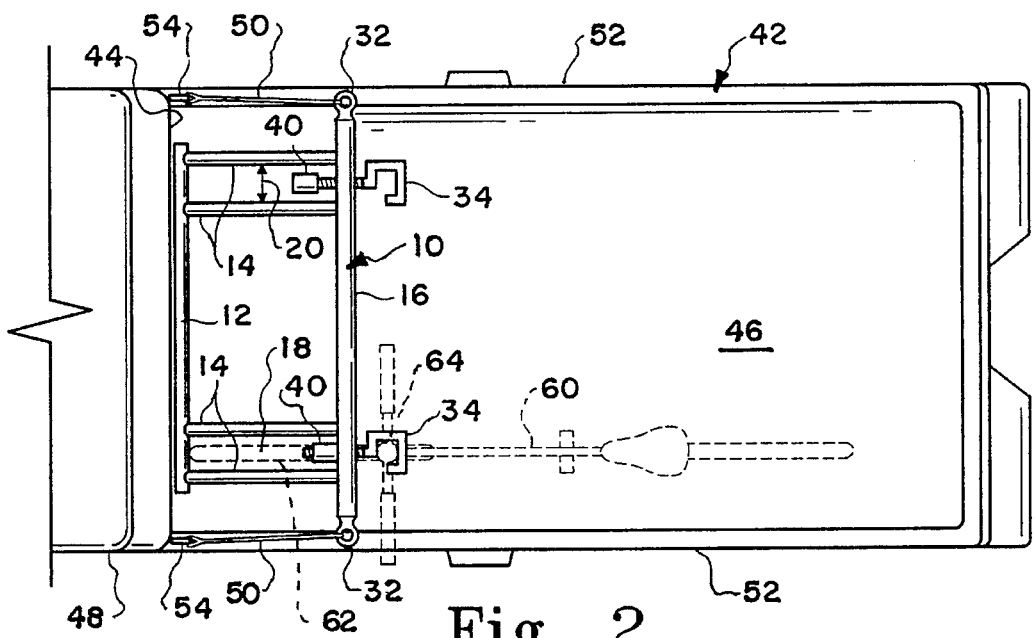
FIG. 2 is a top view of the bicycle storage rack mounted on the cargo area of a pick-up truck.

A bicycle rack for use in a stationary platform or mounted in the back or cargo area of a pick-up truck is illustrated in FIGS. 1 and 2. In FIG. 1, the rack is shown constructed for use on a stationary back; while in FIG. 2, the bicycle rack is illustrated mounted in the cargo area of a pick-up truck.

A bicycle rack 10 constructed according to the invention is shown in FIG. 1 and is comprised of a tubular base member 12, a plurality of upright tubular members 14 and an upper tubular member 16 forming a frame. Preferably, upright or vertical tubular members provide a slot 18 that has a width indicated at 20 to receive the front or rear wheels of a bicycle. Preferably, the spacing is such that the wheels, with or without fenders, will easily fit into slot 18. Tubular members 12, 14 and 16 can be of any suitable strong structural material.

The bicycle storage rack 10, as shown in FIG. 1, can be mounted on a stationary base 22 comprised of horizontal flat bars 24 joined by crossbars 26 to form a rectangular frame. Vertically oriented posts 28 are provided to the hold bicycle storage rack in an upright position. The diameter of posts 28 is selected to fit the hollow interior diameter of outermost, upright bars 14 through holes 30 at each end of tubular support base 12. This allows bicycle storage rack 10 to be removably, but securely mounted on rectangular platform 22. Posts 28 can be secured to flat bars 24 by welding, or any suitable method.

Bicycle storage rack 10 also includes hardware for mounting the rack in the bed of pick-up trucks. For this purpose, eyelets 32 are provided at each end of upper tubular bar 16.

A unique locking mechanism for mounting bicycles in bicycle storage rack 10 is provided by C-shaped hooks or clamps 34, having a threaded shaft 36 passing through holes 38 in upper tubular bar 16. C-shaped hooks are constructed to engage the steering neck, frame or seat support to securely hold a bicycle in rack 10. A specially configured locking nut 40 is provided to bolt a bicycle tightly in the rack as will be described in greater detail hereinafter.

FIG. 2 illustrates bicycle storage rack 10 mounted in the cargo area of a pick-up truck 42. This can be easily and quickly accomplished by simply lifting bicycle storage rack 10 from platform 22 and seating tubular base 12 in foremost corner 44 of the cargo area 46 of pick-up truck 42 against the back of the cab 48. Bicycle storage rack 10 is then secured by straps, cords or wires 50 to the sidewalls 52 of cargo area 46 of pick-up truck 42 by hooks or eyelets 54 permanently mounted on either side close to the rear of cab 48. In this manner, they provide little interference with use of cargo area 46 when the bicycle storage rack is demounted. Cords, straps or wires 50 secure the bicycle rack by connecting eyelets 32 on the end of upper tubular member 16.

Figure 3:
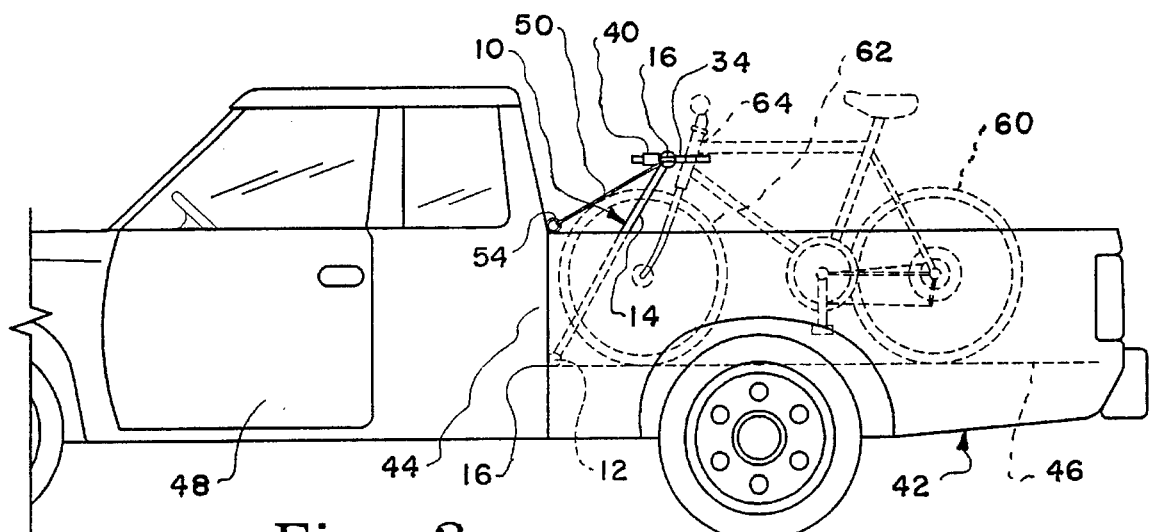
FIG. 3 is a side elevation of the bicycle storage rack mounted in the bed of a pick-up truck as shown in FIG. 2.
Figure 4:
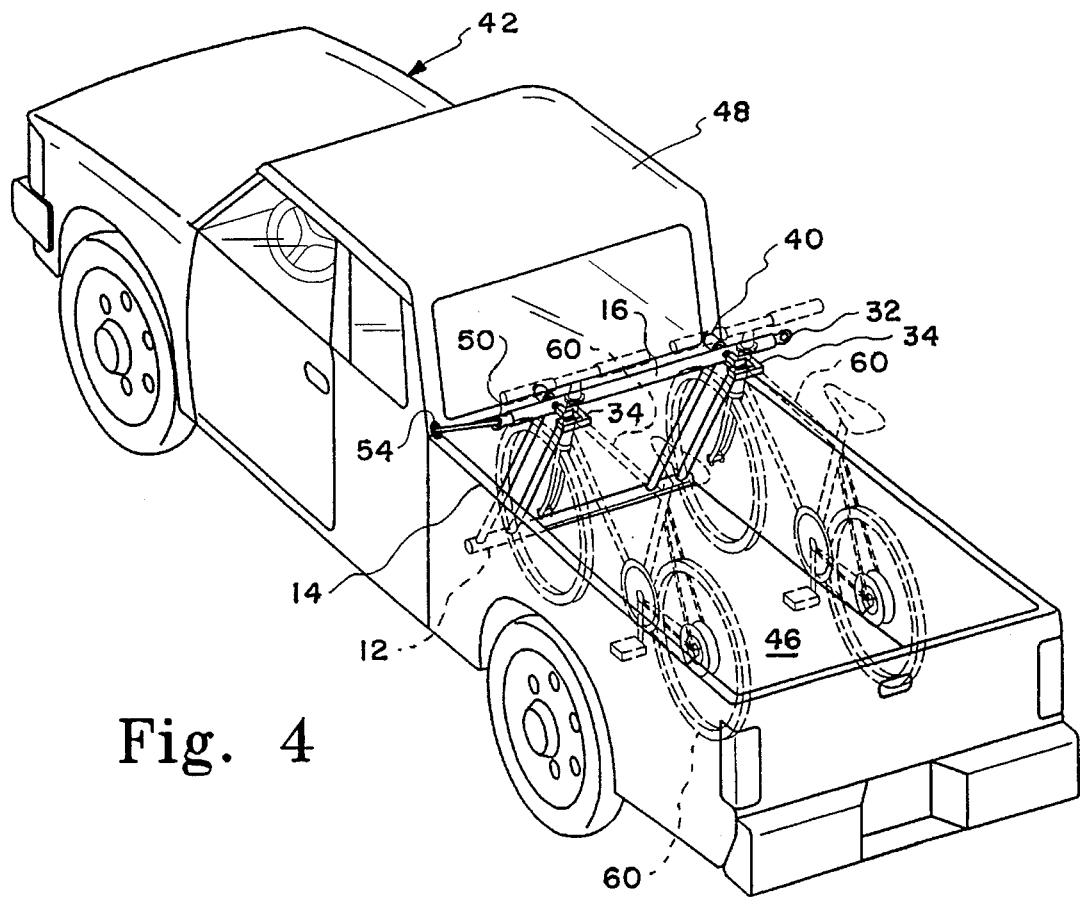
FIG. 4 is a perspective view illustrating two bicycles mounted in the bicycle storage rack in the cargo area of a pick-up truck.

Bicycle 60 is mounted on bicycle storage rack 10 as illustrated in FIGS. 2 through 4. Front wheel 16 is inserted in slot 18 between upright tubular members or bars 14 with c-shaped hook 34 fitted around steering neck 64. Bicycle 60 is then secured by tightening down specially constructed locking nut 40 with a specially designed key, as will be described hereinafter. The force of the C-shaped clamp 34, around steering neck 64, with front wheel 62 in slot 18 and the positioning of lower tubular member 12 in the forward corner of cargo area 46, against 48, holds bicycle 60 and bicycle storage rack 10 in a secure position in the back of pick-up truck 42. No additional tie-downs, wires, clamps, rods or fastening devices are needed.

The secure position of bicycle storage rack 10 and bicycle 60 when mounted and locked by C-shaped hook or clamp 34 is shown more clearly in FIGS. 3 and 4. Lower tubular member 12 is seated in foremost corner between cargo area bottom 46 and the rear 44 of truck cab 48. Wheel 62 of bicycle 60 also abuts rear 44 of cab 48 of pick-up truck 42. The bicycle's storage rack illustrated holds two bicycles, but more can be provided by adding additional upright posts 14.

It should be apparent that the bicycle rack can just as easily be mounted in the rear of bed 46 of pick-up truck 42 with lower tubular hose 12 seated in the corner formed by the tailgate and the bed.

When installed in the cargo area of the truck, the lower tubular base 12 of bicycle storage rack 10 rests in the corner 16 of the bed 46 of the pick-up truck cargo area. The bicycle storage rack leans backwards and is restrained by straps, cords or wires 50 with a C-shaped hook or clamp 34 supporting the bicycles by passing around the steering neck or upper portion of the yoke. C-shaped hooks or clamps 34 have a threaded shaft 36 mounted in holes 38 in upper tubular member 16. They are tightened securely to clamp the bicycle in the bicycle storage rack with specially designed nuts which will be described in greater detail hereinafter. The arrangement rigidly holds bicycle 60 in bicycle storage rack 10.

The specially constructed lock nut 40 is shown in greater detail in FIGS. 5 and 6. Locknut 40 has a inner threaded cylindrical member 68 and an outer concentric cylindrical shell 66 that are held in spaced relationship by ball bearings 70 which allows outer shell 66 to freely rotate on inner threaded cylinder 68. Threaded inner cylinder 68 can be rotated independent of outer cylinder 66 by axially parallel holes 72 in inner threaded cylinder 68. A spring washer 74, at the forward end of threaded cylinder 68, prevents locknut 40 from loosening during use when mounted on threaded shaft 36.

A specially constructed key 76, having pins 78 that fit hole 72 in locknut 40, is illustrated in FIG. 7. Key 76 is comprised of a cylinder 80 having wing portions 82 to allow the key to be easily turned. Key 76 is shown with three pins 78 to illustrate that a variety of arrangements that can be used. Locknut 40 is shown with four equally spaced holes in which case key 76 would have four equally spaced pins 78. Alternatively, locknut 40 could have any number of variable spaced holes 72 in the same combination as pins 78 on key 76 and can be of different shapes such as square, hexagonal, etc. Similar variations in diameter and shape, and configuration of pins 78 and receptacles or holes 72 will provide a wide variety of combinations. Spring washer provides flexing pressure when locknut 40 is mounted on threaded shaft 36 making it difficult to loosen without the properly configured key.

The mounting of a bicycle with locknut 40 is illustrated in FIG. 8. Bicycle 60 is positioned in bicycle storage rack 10 with a front or rear wheel in slot 18 between upright post 14. C-shaped hook or clamp 34 is positioned around yoke or steering neck 64 of bicycle 60. Threaded shaft 36 passes through hole 38 in upper tubular member 16. Locknut 40 is screwed onto threaded shaft 36 and then securely tightened with key 76. No locks, cables or other hardware is need to secure bicycle 60 in rack 10.

Thus there has been disclosed a unique, novel and elegantly simple bicycle storage rack for mounting in the cargo areas of pick-up trucks. The bicycle can be quickly and easily installed and equally, quickly and easily removed when the cargo is needed for other purposes. Further, when not in use, the bicycle storage rack is easily stored in the cab of the truck or may be mounted on a fixed platform.

This invention is not to be limited by the embodiment shown in the drawings and described in the description which is given by way of example and not of limitation, but only in accordance with the scope of the appended claims.

What is claimed is:

1. A bicycle storage rack for mounting and transporting bicycles in a cargo area of a truck comprising;

a lower tubular base, said lower tubular base constructed to seat comfortably in a corner of said cargo area of said truck;

an upper tubular member substantially the same length as said lower tubular base;

a plurality of upright tubular posts joining said lower tubular base and said upper tubular member, said upright posts being spaced at intervals to provide wheel receiving slots;

fastening means on each end of said upper tubular member;

strap means for securing said bicycle storage rack in the cargo area of said truck, said strap means adapted for connecting said fastening means to opposite sidewalls of said truck so that said lower tubular member is braced against a corner of the cargo area with said bicycle storage rack tilted at an angle to receive bicycle wheels in said wheel receiving slots formed by said upright posts; and securing means for securely locking one or more bicycles in said bicycle storage rack for transport by said truck;

whereby said bicycle storage rack may be easily and quickly mounted to, and demounted from said truck.

2. The bicycle storage rack according to claim 1 including mounting means for mounting said bicycle storage rack in an upright fixed position; said mounting means comprising at least two holes through said lower tubular base for receiving mounting posts.

3. The bicycle storage rack according to claim 2 in which said at least two holes comprise a pair of holes at opposite ends of said lower tubular base, said holes being in alignment with a respective upright tubular post; whereby said mounting posts may pass through said lower tubular base up into said upright posts to provide stable support.

4. The bicycle storage rack according to claim 1 in which said securing means comprises; a hole through said upper tubular member above each of said wheel receiving slots; a C-shaped hook constructed to fit around a portion of the frame of a bicycle; a threaded shaft on said C-shaped hook fitting a respective hole in said upper tubular member; and a key operated locknut mounted on said threaded shaft for fastening said C-shaped hook to said bicycle storage rack securely clamping the frame of a bicycle stored in each of said wheel receiving slots to said bicycle storage rack.

5. The bicycle storage rack according to claim 4 in which said locknut is constructed with specially oriented receptacles for receiving a matching key.

6. The bicycle storage rack according to claim 5 in which said specially oriented receptacles comprise at least two axially parallel holes in said locknut.

7. The bicycle storage rack according to claim 6 including prevention means preventing said locknut from being removed without said specially constructed matching key.

8. The bicycle storage rack according to claim 7 in which said removal prevention means comprises a movable housing surrounding said locknut.

9. The bicycle storage rack according to claim 8 in which said movable housing comprises a cylindrical housing concentric with, and surrounding said lock nut; a plurality of ball bearings mounting said cylindrical housing on said locknut whereby said cylindrical housing may rotate freely on said locknut.

10. A bicycle storage rack system for mounting and transporting bicycles in a cargo area of a truck comprising;

a lower tubular base, said lower tubular base constructed to seat comfortably in a corner of said cargo area of said truck;

an upper tubular member substantially the same length as said lower tubular base;

a plurality of upright tubular posts joining said lower tubular base and said upper tubular member, said upright posts being spaced at intervals to provide wheel receiving slots;

fastening means on each end of said upper tubular member;

strap means for securing said bicycle storage rack in the cargo area of said truck, said strap means adapted for connecting said fastening means to opposite sidewalls of said truck so that said lower tubular member is braced with said bicycle storage rack tilted at an angle against a corner of said cargo area to receive bicycle wheels in said wheel receiving slots formed by said upright posts;

mounting means for alternately mounting said bicycle storage rack in an upright position; and securing means for securely locking one or more bicycles in said bicycle storage rack for transport by said truck;

whereby said bicycle storage rack may be easily and quickly mounted to, and demounted from said truck.

11. The bicycle storage rack according to claim 10 in which said securing means comprises; a hole through said upper tubular member above each of said wheel receiving slots; a C-shaped hook constructed to fit around a portion of the frame of a bicycle; a threaded shaft on said C-shaped hook fitting a respective hole in said upper tubular member; and a key operated locknut mounted on said threaded shaft for fastening said C-shaped hook to said bicycle storage rack securely clamping the frame of a bicycle stored in each of said wheel receiving slots to said bicycle storage rack.

12. The bicycle storage rack according to claim 11 in which said locknut is constructed with specially oriented receptacles for receiving a matching key.

13. The bicycle storage rack according to claim 12 in which said specially oriented receptacles comprise at least two axially parallel holes in said locknut.

14. The bicycle storage rack according to claim 13 including removal prevention means preventing said locknut from being removed without said specially constructed matching key.

15. The bicycle storage rack according to claim 14 in which said removal prevention means comprises a movable housing surrounding said locknut.

16. The bicycle storage rack according to claim 15 in which said movable housing comprises a cylindrical housing concentric with, and surrounding said lock nut; a plurality of ball bearings mounting said cylindrical housing on said locknut whereby said cylindrical housing may rotate freely on said locknut.

17. The bicycle storage rack according to claim 10 in which said mounting means for alternately mounting said storage rack in an upright position comprises at least two holes in said lower tubular base, said holes being in alignment with a respective upright tubular mounting post; whereby vertical mounting posts may pass through said lower tubular base up into said upright tubular posts to provide stable support for mounting said bicycle storage rack in an upright position on a platform.

* * * * *